(12) United States Patent
Yamada (10) Patent No.: US 12,097,814 B2
(45) Date of Patent: Sep. 24, 2024

(54) VEHICULAR DEVICE

(71) Applicant: DENSO CORPORATION, Kariya (JP)

(72) Inventor: Kazuhiro Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 476 days.

(21) Appl. No.: 17/548,403

(22) Filed: Dec. 10, 2021

(65) Prior Publication Data

US 2022/0097630 A1 Mar. 31, 2022

Related U.S. Application Data

(63) Continuation of application No. PCT/JP2020/020915, filed on May 27, 2020.

(30) Foreign Application Priority Data

Jun. 14, 2019 (JP) .................. 2019-111188

(51) Int. Cl.
*B60R 16/023* (2006.01)
*B60K 35/00* (2006.01)
*B60K 35/10* (2024.01)
*B60K 35/80* (2024.01)
*B60K 35/85* (2024.01)

(52) U.S. Cl.
CPC ............ *B60R 16/023* (2013.01); *B60K 35/00* (2013.01); *B60K 35/10* (2024.01); *B60K 35/80* (2024.01); *B60K 35/85* (2024.01); *B60K 2360/56* (2024.01)

(58) Field of Classification Search
CPC ...... B60R 16/023; B60K 35/00; B60K 35/10; B60K 35/85
See application file for complete search history.

(56) References Cited

U.S. PATENT DOCUMENTS

| | | |
|---|---|---|
| 2005/0059370 A1 | 3/2005 | Sugiyama et al. |
| 2012/0265405 A1 | 10/2012 | Matsumura et al. |
| 2020/0148144 A1 | 5/2020 | Shiomi |

FOREIGN PATENT DOCUMENTS

| | | | |
|---|---|---|---|
| JP | 2005-102105 A | | 4/2005 |
| JP | 2007-036760 A | | 2/2007 |
| JP | 2007-083857 A | | 4/2007 |
| JP | 2010-103793 A | | 5/2010 |
| JP | 2012-085207 A | | 4/2012 |
| JP | 2012218621 A | | 11/2012 |
| JP | 2014034373 A | * | 2/2014 |
| JP | 2014-162286 A | | 9/2014 |
| JP | 2019018844 A | | 2/2019 |

* cited by examiner

*Primary Examiner* — Benyam Haile
(74) *Attorney, Agent, or Firm* — Harness, Dickey & Pierce, P.L.C.

(57) ABSTRACT

A vehicular device includes a control unit, a main board on which the control unit is mounted, and a module that has a functional unit having different specifications depending on a product model of the vehicular device. The module has a module side control unit configured to control the functional unit of the module. The main board and the module are housed in a casing and connected with each other through a common interface regardless of the specifications of the functional unit. The module side control unit is configured to control the functional unit based on a control command received from the control unit, the control command being common regardless of the specifications of the functional unit.

9 Claims, 9 Drawing Sheets

| PRODUCT MODEL | | JP | US | EP | CN |
|---|---|---|---|---|---|
| FM | Freq (MHz) | F0 TO F1 | F10 TO F11 | F20 TO F21 | F30 TO F31 |
| FM | Step (kHz) | SF0 | SF1 | SF2 | SF3 |
| AM | Freq (kHz) | F2 TO F3 | F12 TO F13 | F22 TO F23 | F32 TO F33 |
| AM | Step (kHz) | SA0 | SA1 | SA2 | SA3 |
| DIGITAL | | | | | |
| DIGITAL | | | | | |

VEHICULAR DEVICE

CROSS REFERENCE TO RELATED APPLICATION

The present application is a continuation application of International Patent Application No. PCT/JP2020/020915 filed on May 27, 2020, which designated the U.S. and claims the benefit of priority from Japanese Patent Application No. 2019-111188 filed on Jun. 14, 2019. The entire disclosures of all of the above applications are incorporated herein by reference.

TECHNICAL FIELD

The present disclosure relates to a vehicular device.

BACKGROUND

In recent years, various functions have been integrated in a vehicular device, such as audio functions such as radio and interfacing with mobile terminals carried by the user. For example, a module may be employed in which the desired function is mounted on a board, in addition to a main board on which a main control unit is mounted.

According to the above-described method, the specifications of the vehicular device can be changed for each product model by replacing the module.

However, when the hardware configuration such as tuners configured to receive radio broadcasts is modularized and the module is replaced, the tuners are controlled by the main board. Accordingly, it may be necessary to change wire configurations and software configurations of the main board in accordance with the tuners. That is, multiple main boards having different specifications in accordance with the product model are required. That is, the benefits of the modularization may not be effectively utilized in the conventional technique.

SUMMARY

A vehicular device of an aspect of the present disclosure includes a control unit, a main board on which the control unit is mounted, and a module that has a functional unit having different specifications depending on a product model of the vehicular device. The module has a module side control unit configured to control the functional unit of the module. The main board and the module are housed in a casing and connected with each other through a common interface regardless of the specifications of the functional unit. The module side control unit is configured to control the functional unit based on a control command received from the control unit, the control command being common regardless of the specifications of the functional unit.

EMBODIMENTS

Hereinafter, embodiments of the present disclosure will be described.

First Embodiment

Figure 1:
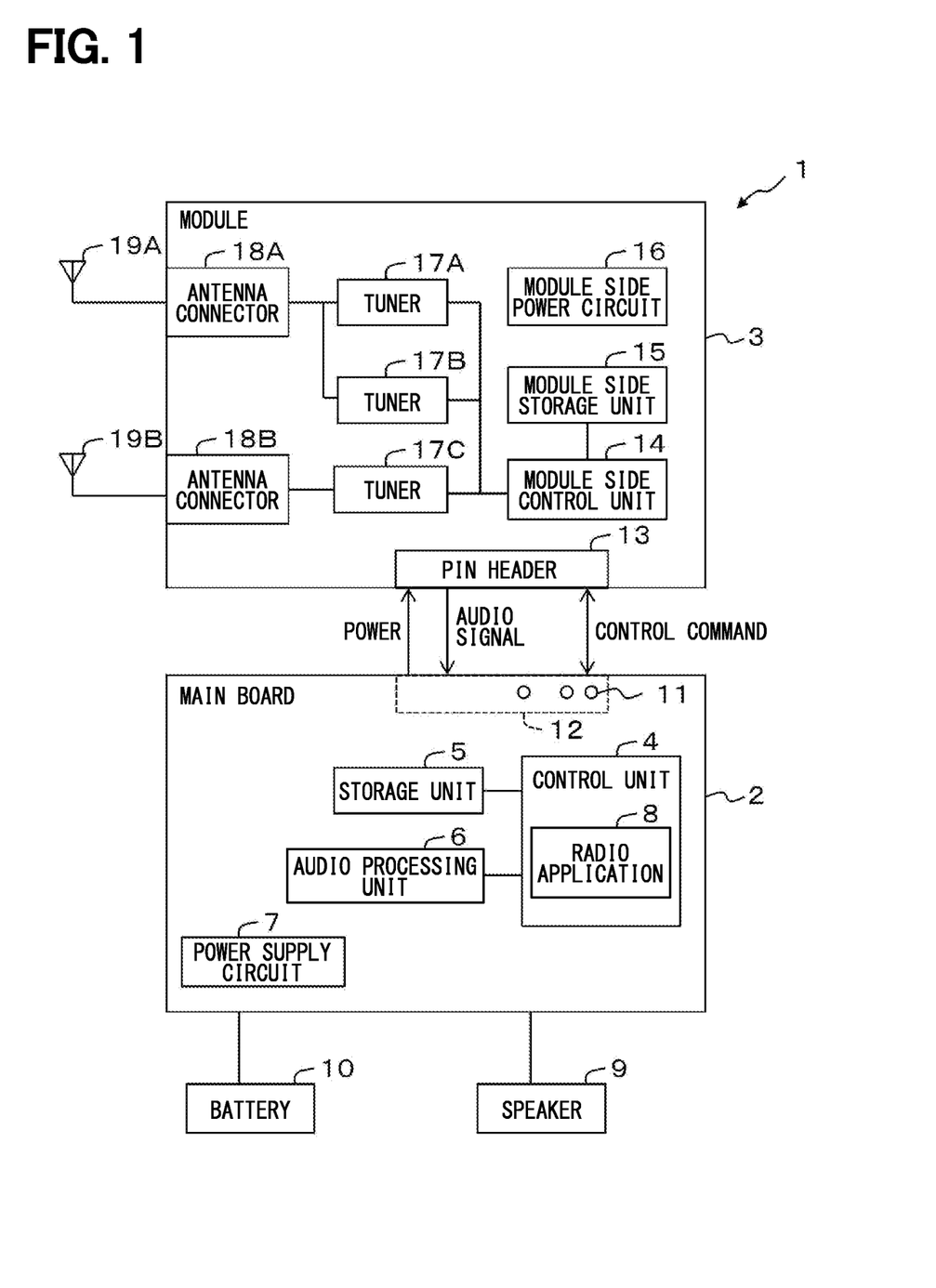
FIG. 1 is a diagram schematically showing a configuration of a module according to a first embodiment.

A first embodiment will be described. In the first embodiment, a modularized configuration and a basic concept of the modularization will be described. As shown in FIG. 1, a vehicular device 1 includes a main board 2, and a module 3 coupled to the main board 2. Although only one module 3 is illustrated in FIG. 1, multiple modules 3 may be coupled to the main board 2.

Although the details will be described later, the main board 2 includes a control unit 4 configured to control the vehicular device 1, a storage unit 5, an audio processing unit 6, a power supply circuit 7, and the like. The control unit 4 includes a microcontroller equipped with CPU and the like (not shown), and is configured to control the vehicular device 1 by executing a computer program stored in the storage unit 5.

The control unit 4 is configured to control the module 3. In the present embodiment, the module 3 is configured to receive radio programs having different frequencies depending on the country, that is, receive different radio programs depending on the product model of the vehicular device 1. This product model varies depending on where the vehicular device 1 is used, e.g. the country and the region.

Accordingly, the control unit 4 includes a radio application 8 configured to control reception of radio programs and frequency switching. The radio application 8 constitutes a Human Machine Interface for receiving the radio programs. Hereinafter, the Human Machine Interface will be referred to as HMI. In the present embodiment, the radio application 8 is provided for all the possible product models. That is, it is not necessary to change the radio application 8 depending on the product model, and the HMI corresponding to the product model is selected, depending on the module 3 connected to the main board 2, from the HMIs stored in the storage unit 5 for each country or region.

The storage unit 5 is a non-volatile memory such as embedded Multi Media Card and stores various data such as the computer program executed by the control unit 4. Hereinafter, the embedded Multi Media Card will be referred to as eMMC.

The audio processing unit 6 includes a digital signal processor and the like, and is configured to process the audio signal transmitted from the module 3. The audio signal is transmitted from the module 3 in I2S format or SPI format. The audio processing unit 6 outputs the processed audio signal to the speaker 9, and thereby the speaker 9 outputs sound. When the control unit 4 has built-in hardware for digital signal processing, or the audio processing is executed by the control unit 4 in software manner, the audio processing unit 6 may be provided in the control unit 4.

The power supply circuit 7 is connected with a battery 10 mounted in the vehicle and configured to supply power to devices mounted on the main board 2. The power supply circuit 7 is configured to supply power to the module 3 too.

The main board 2 has multiple through-holes 11 for electrical connection with the module 3. The through-holes 11 constitute a board side connection portion 12 configured to connect with the module 3. Pins of a pin header 13 provided in the module 3 are inserted into and soldered to the board side connection portion 12. As a result, the main board 2 and the module 3 are electrically connected with each other. The pin header 13 corresponds to a module side connection portion.

On the module 3, a module side control unit 14, a module side storage unit 15, a module side power supply circuit 16 configured to supply power to the module 3, multiple tuners 17A, 17B, 17C, and antenna connectors 18A, 18B are mounted. The tuner 17 may have a metal shield structure such as a silicon tuner or be configured by a discrete circuit using multiple devices. The number of the tuners 17 is an example and is not limited thereto. The antenna connectors 18 may be formed integrally with the tuners 17.

The module side control unit 14 is configured to control the tuners 17 mounted on the module 3. The module side control unit 14 is configured to set or change frequency of the tuner 17 based on a control command transmitted from the control unit 4. At this time, the control command transmitted from the control unit 4 is a common control command regardless of the type of the tuner 17. The module side control unit 14 is configured to notify the control unit 4 of the type of the tuner 17 which differs depending on the product model of the vehicular device 1.

The module 3 is configured to output the audio signal in a predetermined format such as I2S format and SPI format. That is, the control unit 4 and the module side control unit 14 are connected with each other through a common interface in view of the electrical connection such as the control command and the audio signals, and also in view of the physical connection between the board side connection portion 12 and the pin header 13. The audio signal may be output directly from the tuner 17 or indirectly through the module side control unit 14.

The module side storage unit 15 includes a non-volatile memory such as eMMC and stores the computer program executed by the module side control unit 14. The module side storage unit 15 stores the settings of the tuner 17 configured by the control unit 4. Although there are differences depending on the country and region, the module side storage unit 15 stores, for example, Last Frequency, Last Preset Number Present Channel, AM broadcast Station List, FM broadcast Station List and the like when the module side storage unit 15 has an analog system. The module side storage unit 15 stores, for example, the traffic information band, the traffic information frequency and the like when it has the analog system.

The tuner 17 is configured to receive radio programs. In the present embodiment, the tuner 17A is configured to receive AM programs, the tuner 17B is configured to receive FM programs, and the tuner 17C is configured to receive digital programs. Accordingly, the tuner 17A and the tuner 17B are connected with the same antenna 19A configured to receive analog radio programs, and the tuner 17C is connected with the antenna 19C configured to receive digital radio programs. Whether or not the tuner 17C is mounted is selected for each country or region such as Japan and America where digital radio program is broadcast.

Figure 2:
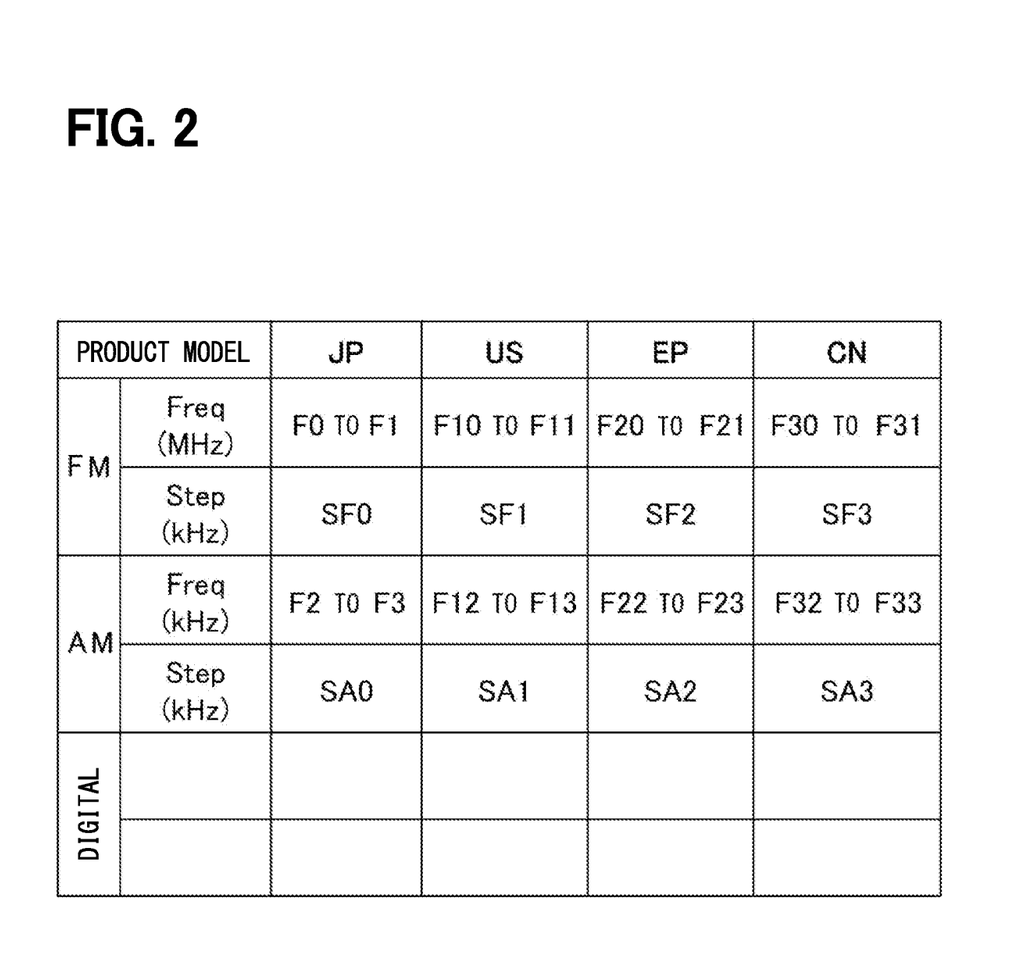
FIG. 2 is a diagram showing an example of frequency ranges and tuning steps for product models.

The tuners 17A, 17B, 17C are configured to receive radio programs having different frequencies depending on the product model, as shown in FIG. 2. Specifically, for Japan, which is shown as JP in FIG. 2, the frequency range for FM programs to be received is between F0 and F1 (MHz), and the tuning step is SF0 (kHz). Further, the frequency range for AM programs to be received is between F2 and F3 (kHz), and the tuning step is SA0 (kHz).

Further, for Europe, which is shown as EP in FIG. 2, the frequency range for FM programs to be received is between F10 and F11 (MHz), and the tuning step is SF10 (kHz). Further, the frequency range for AM programs to be received is between F12 and F13 (kHz), and the tuning step is SA10 (kHz).

Further, for America, which is shown as US in FIG. 2, the frequency range for FM programs to be received is between F20 and F21 (MHz), and the step width for tuning is SF20 (kHz). Further, the frequency range for AM programs to be received is between F22 and F23 (kHz), and the tuning step is SA20 (kHz).

Further, for China, which is shown as CN in FIG. 2, the frequency range for FM programs to be received is between F30 and F31 (MHz), and the tuning step is SF30 (kHz). Further, the frequency range for AM programs to be received is between F32 and F33 (kHz), and the tuning step is SA30 (kHz).

Figure 3:
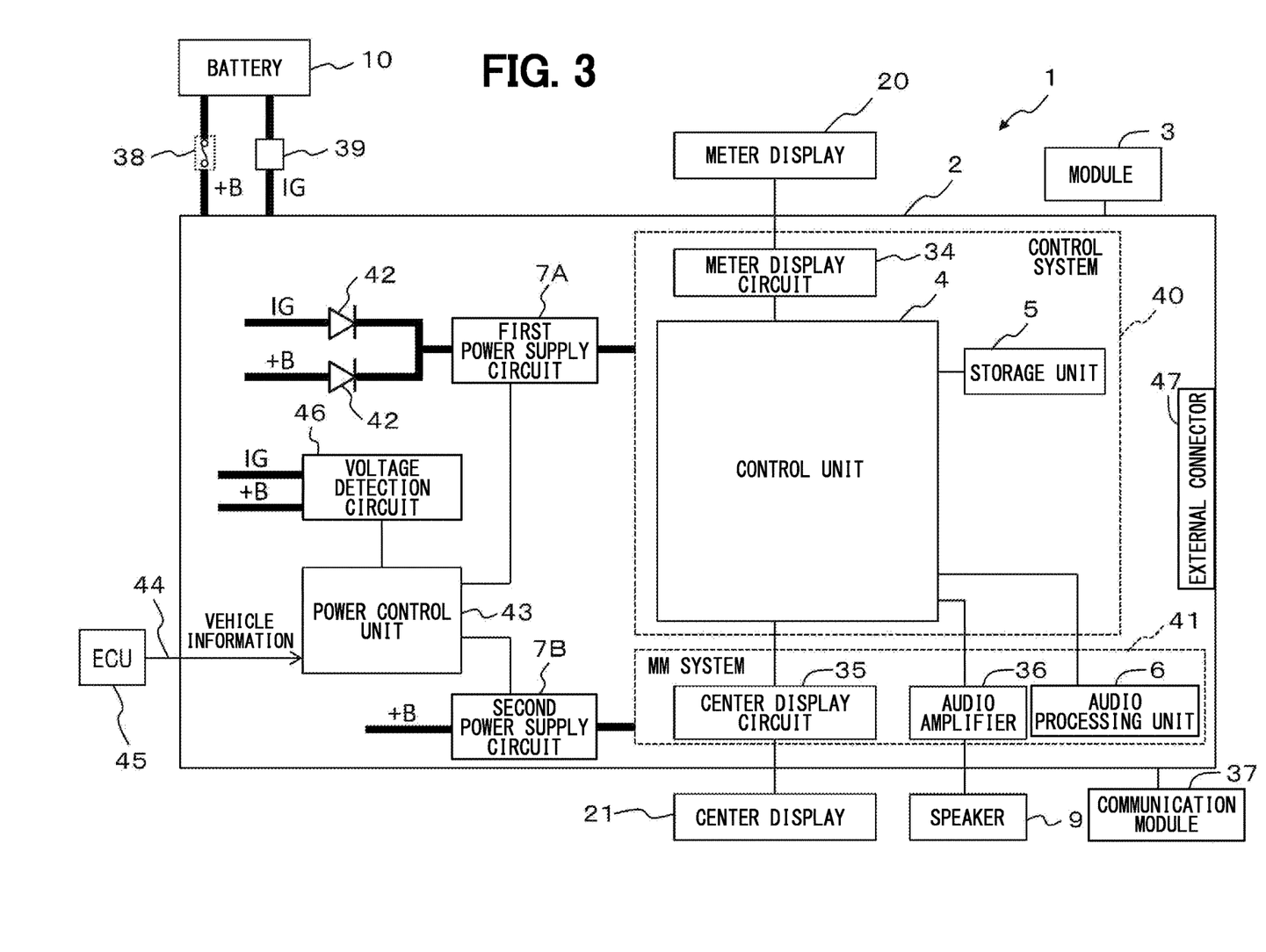
FIG. 3 is a diagram illustrating a configuration of a vehicular device.

The main board 2, to which the module 3 is connected, is connected to display devices such as a meter display 20 and a center display 21 as shown in FIG. 3. As will be described later, these display devices are provided to display information on the state of the vehicle and information required for the vehicle to travel such as a navigation screen 26, a menu screen 27, and the like. The vehicular device 1 is connected to the speaker 9. The speaker 9 is configured to output audio guidance during navigation, sound of played music, and sound of the radio program. The vehicular device 1 is included in a cockpit system that realizes so-called vehicle infotainment for presenting various information to a user.

Figure 4:
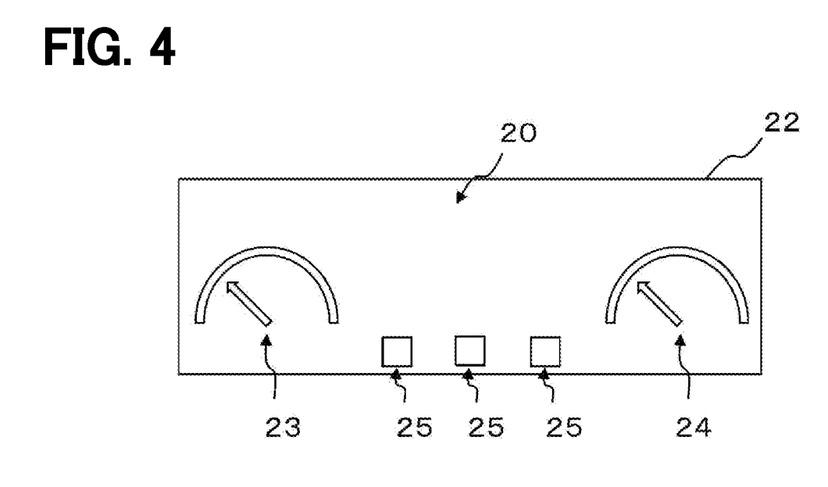
FIG. 4 is a diagram schematically showing an example of a display mode of a meter display.

The meter display 20 is provided by, for example, a liquid crystal display or an organic EL display, and is disposed on a meter panel 22 located on a front side of the driver as shown in FIG. 4. In the present embodiment, the meter panel 22 is entirely composed of a display device as the meter display 20 to perform displays in full graphics of, for example, a speedometer 23, a tachometer 24, and warning lights 25. The meter display 20 may be located at, for example, the center portion of the meter panel 22, and the speedometer 23, the tachometer 24, and the warning lights 25 may be provided separately.

The meter display 20 mainly displays, for example, vehicle speed, warning, information stipulated by law, information indicating a state of the vehicle such as the remaining amount of fuel and whether or not the seatbelt is fastened, and information indicating traveling state or safety of the vehicle. Hereinafter, these information will be referred to as "control system information" for convenience. Further, the meter display 20 also displays an activation message indicating activation of the vehicular device 1 and a deactivation message indicating deactivation of the vehicular device 1.

Figure 5:
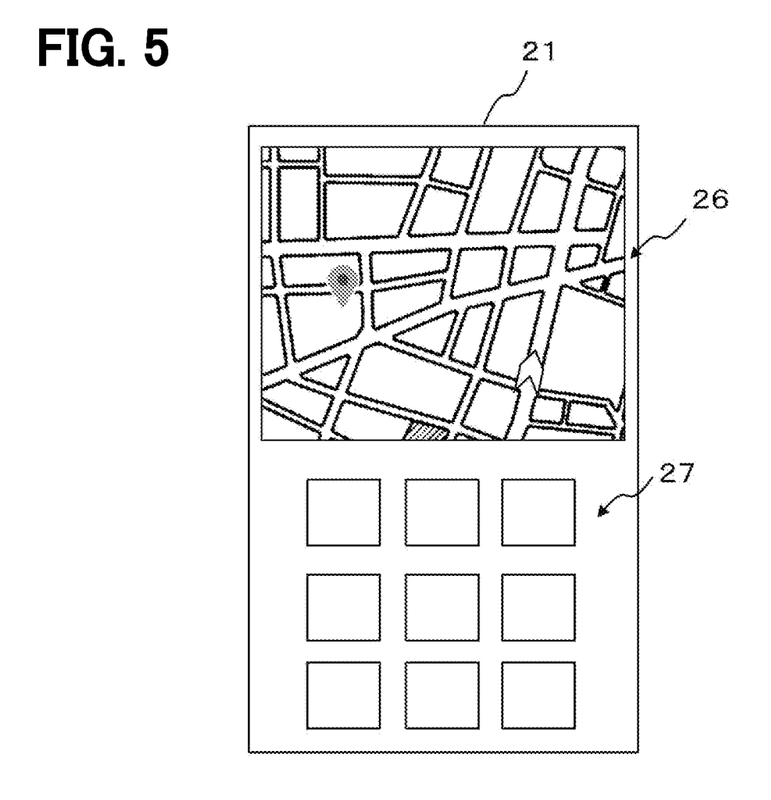
FIG. 5 is a diagram schematically showing an example of a display mode of a center display.

The center display 21 is, for example, a liquid crystal display or an organic EL display, and is disposed close to a so-called center console. As shown in FIG. 5, the center display 21 displays, for example, a navigation screen 26 and a menu screen 27. The center display 21 can also display TV programs, and information about a music which is being played. That is, the center display 21 mainly displays so-called multimedia information such as the navigation screen 26 and the menu screen 27.

As described above, in the vehicular device 1, multiple functional units including a functional unit that displays information indicating the state of the vehicle and a functional unit that displays multimedia information are integrated to provide various information. The vehicular device 1 is an integrated type device that can present the various information visually or audibly to the user.

The meter display 20 and the center display 21 can display information by seamlessly linking with one another in the vehicular device 1. For example, the navigation screen 26 can be displayed on the meter display 20, and the vehicle speed can be displayed on the center display 21. However, the number, the arrangement, and the type of the display devices connected to the vehicular device 1 are just an example, and the present disclosure is not limited thereto.

The control unit 4 is composed of a so-called microcontroller having a CPU and the like (not shown). The control unit 4 controls the vehicular device 1 by executing a program stored in the storage unit 5 that may include a non-volatile memory such as eMMC. The storage unit 5 further stores multiple HMIs to receive radio programs which differ depending on the country or region.

Figure 6:
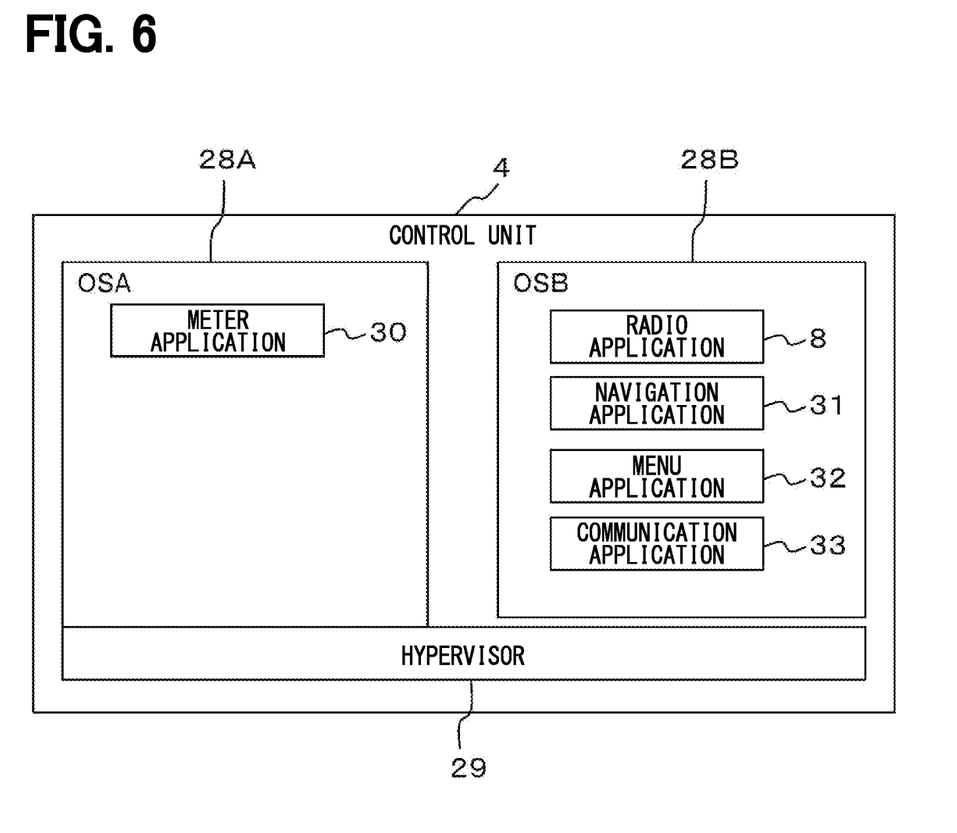
FIG. 6 is a diagram schematically showing a software configuration of a control unit.

In the control unit 4, a virtual environment in which two operating systems 28 operate is created as shown in FIG. 6, for example. That is, in the vehicular device 1, multiple systems are operating on one hardware. Hereinafter, the operating system 28 will be referred to as an OS 28. In the present embodiment, the OS 28A and OS 28B operate on a hypervisor 29 provided as a function of the OS 28A. The hypervisors 29 may be provided individually, and the OS 28A and OS 28B may operate on the corresponding hypervisors 29.

The OS 28A is a so-called real-time OS, and includes functional blocks that mainly execute a process (e.g., a process related to vehicle travelling or safety) that requires a real-time response as compared with the OS 28B. In general, such a real-time OS is less likely to cause a problem in the OS 28A itself, and can be considered to have relatively higher stability than a general-purpose OS because it can predict or limit the execution time of an application.

The OS 28B is a so-called general-purpose OS. Although its required real-time response and stability are relatively low as compared with the OS 28A, it has an advantage that general-purpose processing such as a so-called multimedia function can be easily executed. The control unit 4 is configured to control functional units by executing applications on the OS 28.

The control unit 4 has, as the functional units, a meter application 30 configured to display the control system information on the meter display 20, a radio application 8 configured to present radio programs, a navigation application 31 configured to display the navigation screen 26 on the center display 21, a menu application 32 configured to display a menu screen 27, a communication application 33 configured to communicate with external devices, and the like. These functional units are realized in a software manner by a program executed on the control unit 4. The number and types of functional units shown in FIG. 6 are just an example, and the number and types of functional units are not limited thereto.

The control system information displayed on the meter display 20 relates to the vehicle traveling or safety. Therefore, prompt display and appropriate update of the control system information are required. Accordingly, the meter application 30 is provided on the OS 28A that has higher stability. As shown in FIG. 3, the information drew by the meter application 30 is transmitted through a meter display circuit 34 to the meter display 20 as an image data in LVDS format, for example. The meter application 30 is a functional unit that needs to maintain its operation even when the power voltage supplied by a battery 10 drops.

The meter application 30 is configured to create at least one of an activation message or an activation image indicating that the vehicular device 1 is activated at the time of the activation of the vehicular device 1. The meter application 30 is configured to create at least a stop message or a stop image indicating that the vehicular device 1 stops when the vehicular device 1 stops. The activation message, the activation image, the stop message, and the stop image are created as still images, moving images, or animation.

In contrast, presenting the radio program and displaying the navigation screen 26 or the menu screen 27 do not require high real time performance as compared with the control system information. Further, they are multimedia information including the image, video, music, audio guidance and the like. Therefore, the navigation application 31 and the menu application 32 are implemented on the OS 28B.

The information displayed by the navigation application 31 and the menu application 32 is transmitted through a center display circuit 35 to the center display 21 as image data in LVDS format, for example. The music or audio guidance is output to the speaker 9 as an audio signal through an audio amplifier 36 and thus played. The navigation application 31 and the menu application 32 are functional units having a relatively low necessity for maintaining the operation when the voltage supplied from the battery 10 drops as compared with the above-described meter application 30.

Further, the communication application 33 configured to communicate with external devices is connected with various devices, and accordingly the communication application 33 is provided on the OS 28B to perform general-purpose processing. The communication application 33 is configured to communicate with external devices such as a mobile terminal carried by the user and a storage device using a communication method such as USB, Wi-Fi, and Bluetooth (registered trademark).

In the present embodiment, the devices for realizing the above-described communication methods are modularized as a communication module 37 connected to the main board 2. The frequency range available for Wi-Fi differs depending on the country or region. However, modularization of the communication module 37 makes it possible to support specifications that vary depending on the country or region by replacing the communication module 37 in the same way as the module 3. However, another communication method or multiple communication methods may be adopted.

The vehicular device 1 is supplied with power from the battery 10. Specifically, the vehicular device 1 is supplied with power through a path connecting the vehicular device 1 with the battery 10 via a fuse 38, and through a path connecting the vehicular device 1 with the battery 10 via a switch 39 linked to an ignition. Hereinafter, the power supplied from the battery 10 via the fuse 38 is referred to as +B, and the power supplied via the switch 39 is referred to as IG. In FIG. 3, +B and IG are shown by relatively thick solid lines for the sake of explanation.

The vehicular device 1 includes: functional units of the control system that need to maintain its operation even when the voltage from the battery 10 temporarily drops due to cranking for starting the engine; and functional units of the multimedia system that have a relatively low need to maintain its operation. Hereinafter, the functional units of the multimedia system are referred to as the functional units of a MM system for convenience.

The functional units of the control system operate using the devices such as the control unit 4, the storage unit 5, and the meter display circuit 34. Hereinafter, the devices used by the functional units of the control system are referred to as control-system devices 40 for convenience. The functional units of the MM system operate using the communication module 37 or the devices such as the center display circuit 35 and the audio amplifier 36. Hereinafter, the devices used by the functional units of the MM system are referred to as MM-system devices 41 for convenience.

The control-system devices 40 are supplied with power from a first power supply circuit 7A. The first power supply circuit 7A has a circuit configuration for low voltage such that the control-system devices 40 are supplied with power even when the voltage supplied from the battery 10 drops. Specifically, a minimum operating voltage of the first power supply circuit 7A for supplying power is lower than the presumable lowest voltage during cranking.

IG and +B are input to the first power supply circuit 7A through diodes 42 to form a wired OR. Accordingly, even when the fuse 38 is removed to reduce the dark current, for example, during transportation of the vehicle, the power can be supplied through the first power supply circuit 7A to the control-system devices 40 by turning the switch 39 on. As a result, it is possible to display images on the meter display 20 and the like. Since the first power supply circuit 7A is for the lower voltage, the control-system devices 40 can be supplied power enough for the control-system devices 40 to operate normally even when the voltage drops during the cranking.

The MM-system devices 41 are supplied with power from the second power supply circuit 7B. A minimum operating voltage of the second power supply circuit 7B is lower than the rated voltage of the battery 10. The second power supply circuit 7B does not include the low voltage countermeasure circuit configuration that can deal with a low voltage as the first power supply circuit 7A. Accordingly, when the voltage from the battery 10 drops significantly, the power supply to the MM-system devices 41 may become unstable. The second power supply circuit 7B receives +B.

The first power supply circuit 7A and the second power supply circuit 7B are controlled by the power control unit 43. This power control unit 43 is always energized and is normally in a sleep mode. The power control unit 43 is activated in response to an input of an activation signal for activating the vehicular device 1 from an external ECU 45 connected through a CAN line 44, and starts controlling the power supply circuits. In the present embodiment, the signal indicating that a door of the vehicle opens is used as the activation signal.

The power control unit 43 also receives the detection result of the power supply voltage by a voltage detection circuit 46. The voltage detection circuit 46 includes, for example, a comparator with hysteresis and is configured to compare the power supply voltage with a predetermined reference voltage. Subsequently, the voltage detection circuit 46 outputs an L-level signal as the detection result when the power supply voltage is lower than the reference voltage, and outputs an H-level signal as the detection result when the power supply voltage is greater than or equal to the reference voltage.

The power control unit 43 is configured to control the first power supply circuit 7A and the second power supply circuit 7B based on the detection result by the voltage detection circuit 46. For example, the power control unit 43 operates only the first power supply circuit 7A when the voltage from the battery 10 drops due to the cranking, and the power control unit 43 operates the first power supply circuit 7A and the second power supply circuit 7B when the voltage from the battery 10 is the normal voltage.

Moreover, the main board 2 has external connectors 47 including multiple connectors or various types of connectors configured to connect the main board 2 with external devices. In FIG. 3, only one external connector 47 is shown for convenience.

Next, the operations of the configuration described above will be explained. The frequency range and the tuning step of the radio programs differ depending on the country and region. However, when the hardware for receiving the radio programs is modularized, it is necessary for the main board to control the tuner 17.

Accordingly, despite the modularization, it is necessary to change software of the main board according to the tuner 17 or provide a different main board according to an assignment of the pins of the tuner 17. Therefore, the specifications may not be changed simply by replacing the module, and accordingly the benefits of the modularization may not be effectively utilized. In the present embodiment, the benefits of the modularization can be effectively utilized as follows.

First, for receiving the radio programs by the vehicular device having different specifications depending on its product model, HMIs for various specifications are necessary. Accordingly, the vehicular device 1 stores, in the storage unit 5, the HMIs for each country and region.

Further, the module 3 has the module side control unit 14 configured to control the tuners 17 in addition to the tuners 17 for receiving the radio programs. That is, the module 3 of the present embodiment is configured to control the tuners 17 for receiving the radio programs.

The module side control unit 14 is configured to set or change the frequency of the tuner 17 based on a control command transmitted from the control unit 4. At this time, the control command transmitted from the control unit 4 is a common control command regardless of the type of the tuner 17. This is because the desired radio program can be selected by a common method regardless of the country or region, e.g. increasing the frequency (tuning up) or decreasing the frequency (tuning down).

That is, when receiving the radio programs, the same operation can be performed by transmitting a control command for the tuning up, for example, regardless of the tuners 17 actually used. That is, when receiving the radio programs, the command actually used for setting or changing the frequency can be replaced with an abstracted control command, and accordingly the common control command can be used regardless of the country or region. Similarly, skipping to the next channel, registering a favorite program, and the like can be performed by the common operation.

Further, when receiving the radio programs, the audio signals are obtained as the receiving result regardless of the country or region. That is, when the functions for receiving the radio programs are modularized, the module outputs common output that is the audio signals. Then, the audio signals can be output in a format having physically and electrically fixed specifications such as I2S and SPI.

When the control command is the common command, the number and the arrangement of the signal pins for transmitting the control command between the main board 2 and the module 3 can be fixed. Further, since the audio signals can be output in a format having the fixed specifications, the number and the arrangement of the signal pins for transmitting the audio signals between the main board 2 and the module 3 can be fixed.

As described above, the module 3 is provided with the module side control unit 14 so that the actual control of the tuner 17 can be performed in the module 3. That is, the functional units for receiving the radio programs are modularized together with the control functions of the tuners 17. Accordingly, a common interface between the main board 2 and the module 3 can be used in view of the electrical connection and the physical connection. Accordingly, the specifications of the radio programs which vary depending on the country or region can be dealt with simply by replacing the module 3.

When some change is required for the main board 2 due to the replacement of the module 3, the benefits of the modularization may be diminished. In view of this point, the module side control unit 14 is configured to notify the control unit 4 of information indicative of the product model. Specifically, the module side control unit 14 is configured to perform the process shown in FIG. 7. When the module side control unit 14 is energized to be activated, the module side control unit 14 notifies the control unit 4 of information in step S1.

Figure 7:
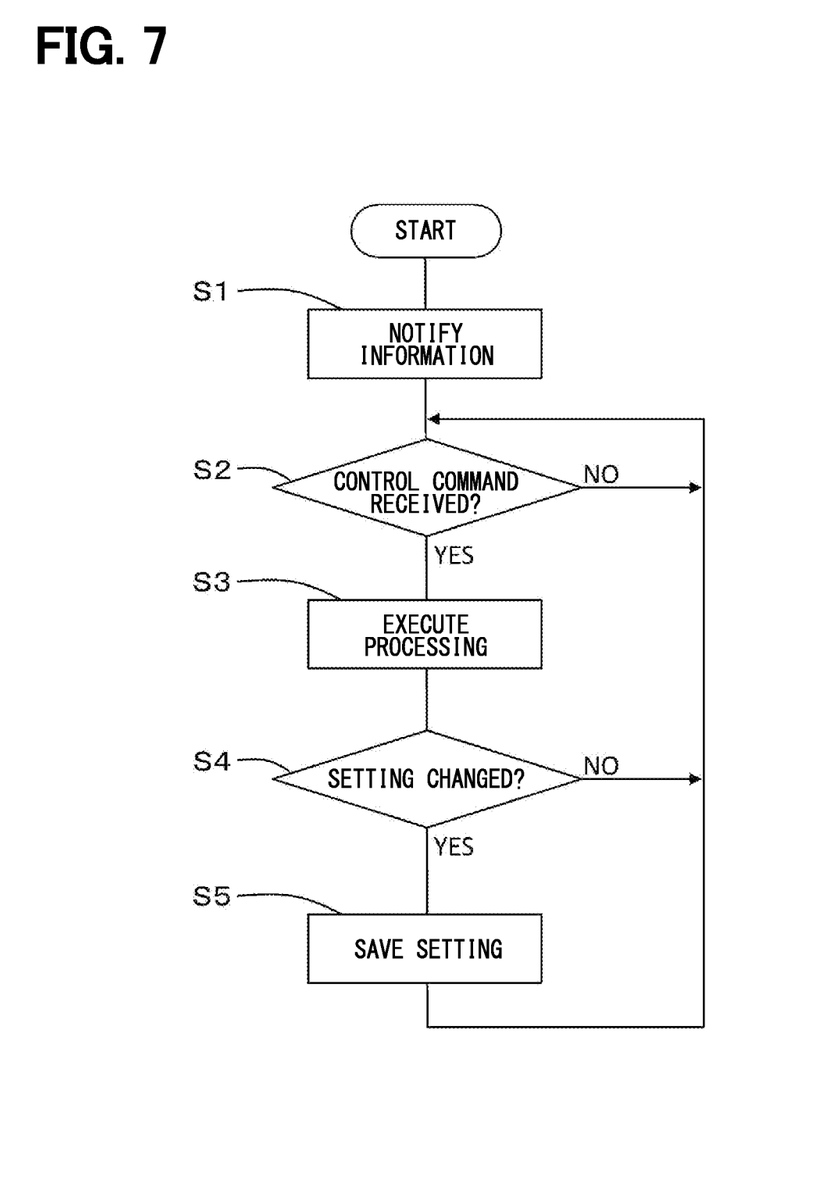
FIG. 7 is a flowchart illustrating a process performed by a module side control unit.

The information notified at this time is information identifying the product model. For example, vehicle parameters according to the country or region where the vehicle is used may be stored in the module side storage unit 15, and the vehicle parameters may be read and notified the control unit 4 of it at the activation.

In step S2, the module side control unit 14 determines whether the module side control unit 14 received the control command from the control unit 4, and the module side control unit 14 waits for the control command when the module side control unit 14 determined that the control command was not received (step S2: NO). In contrast, when the module side control unit 14 determined that the module side control unit 14 received the control command (step S2: YES), the module side control unit 14 performs the process corresponding to the received control command, in step S3.

Subsequently, in step S4, the module side control unit 14 determines whether any setting was changed due to the execution of the process. When the module side control unit 14 determined that any setting was not changed (step S4: NO), the process returns to step S1 to wait for the control command.

In contrast, when the module side control unit 14 determines that some setting was changed (step S4: YES), the module side control unit 14 stores the changed setting to the module side storage unit 15 in step S5. As a result, even when the power is turned off after the frequency was changed, for example, the channel can be tuned to the last viewed program without the user operation by reading the stored setting at the next activation.

As described above, since the module 3 of the present embodiment has the module side control unit 14, the actual control of the tuners 17 can be performed by the module 3. Accordingly, the module 3 is connected to the main board 2 through the electrically and physically common interface and controlled by the common control command. Further, the module 3 outputs the audio signals in the common format.

According to the embodiment described above, following advantages can be attained. The module 3 is for the vehicular device 1 and connected to the main board 2 on which the control unit 4 is mounted. The module 3 includes at least one tuner 17 configured to receive the radio programs, the module side control unit 14 configured to control the tuner 17, and the pin header 13 that is the module side connection portion configured to electrically connect the module 3 with the main board 2.

The tuner 17 is selected and mounted on the module 3 in accordance with the product model of the vehicular device 1. The pin header 13 electrically and physically connects the module 3 and the main board 2 through the common interface. The module side control unit 14 is configured to control the tuner 17 based on the control command received from the main board 2, the control command being common regardless of the specifications of the tuner 17.

According to this, the module 3 can control the tuner 17, unlike the case where only the tuner 17 which is the hardware part for receiving the radio programs is modularized. Accordingly, the main board 2 can substantially control the tuner 17 using the abstracted control command. Therefore, it is not necessary to change the software on the main board 2 according to the tuner 17 or to provide another main board 2 according to the assignment of the pins of the tuner 17. Accordingly, the benefits of the modularization can be effectively utilized.

The module 3 is configured to output the audio signals to the main board 2 in the same output format regardless of the specifications of the tuner 17. Accordingly, the interface for the audio signals can be common in addition to the control command.

The module 3 includes the non-volatile module side storage unit 15, and the module side control unit 14 stores the settings of the tuner 17 to the module side storage unit 15. Accordingly, even when the vehicular device 1 is turned off and the module 3 stops operating, the settings can be read out at the next activation. Accordingly, the user can view the last viewed channel without the user operation, that is, the convenience can be improved.

The module side control unit 14 is configured to notify the main board 2 of information indicative of the product model. According to this, the control unit 4 of the main board 2 can identify the product model of the module 3 by connecting with the module 3 and turning it on. Accordingly, it is not necessary to change the software on the control unit 4 for each module 3 to be connected, and the benefits of the modularization can be effectively utilized. In this case, since the HMIs for the product models are stored in the storage unit 5 in the present embodiment, suitable HMI can be automatically selected, and accordingly the convenience can be improved.

Further, since the connection interface is common and the module side control unit 14 is provided, the module 3 itself can be tested by connecting a test device and outputting the control command without mounting on the main board 2. Accordingly, when manufacturing the module 3 is outsourced, the module 3 can be tested without disclosing the specifications and the software on the main board 2. Further, it can be possible to properly share the intellectual property between the company and the subcontractor including the license of the software.

The vehicular device 1 includes the control unit 4 mainly controls the vehicular device 1, the main board 2 on which the control unit 4 is mounted, and the module 3 that has the tuner 17 as the functional unit having the specifications in accordance with the product model of the vehicular device 1. The module 3 has the module side control unit 14 configured to control the functional unit of the module 3, and the main board 2 and the module 3 are connected with each other through the common interface regardless of the specifications of the functional unit. The module side control unit 14 is configured to control the functional unit based on the control command received from the control unit 4, and the control command is common regardless of the specifications of the functional unit.

According to such vehicular device 1, the module 3 can control the tuner 17, unlike the case where only the tuner 17 which is the a hardware part for receiving the radio programs is modularized. Accordingly, the main board 2 can substantially control the tuner 17 using the abstracted control command. Therefore, it is not necessary to change the software on the main board 2 according to the tuner 17 or to provide another main board 2 according to the assignment of the pins of the tuner 17. Accordingly, the benefits of the modularization can be effectively utilized.

The module 3 of the vehicular device 1 has at least one or more of the tuner 17 as the functional unit. According to this, multiple functions such as receiving analog radio programs and receiving digital radio programs can be modularized.

The module 3 of the vehicular device 1 has non-volatile the module side storage unit 15 that stores the settings of the functional unit. Accordingly, even when the vehicular device 1 is turned off and the module 3 stops operating, the settings can be read out at the next activation. Accordingly, the user can view the last viewed channel without the user operation, that is, the convenience can be improved.

The vehicular device 1 includes multiple modules 3 and the communication modules 37 connected to the main board 2. Accordingly, it is possible to flexibly support the specifications that differ depending on the country or region, e.g. the frequency range of the radio programs and the frequency available for Wi-Fi.

The module 3 of the vehicular device 1 has one or more tuners 17 as the functional unit configured to receive the radio programs, and the tuner 17 has the different specifications depending on the product model of the vehicular device 1. The pin header 13 that is the module side connection portion electrically and physically connects the module 3 and the main board 2 through the common interface. The module side control unit 14 is configured to control the tuner 17 based on the abstracted control command received from the main board 2, the control command being common regardless of the specifications of the tuner 17.

Accordingly, the command actually used for setting or changing the frequency of the tuner 17 can be replaced with an abstracted control command, and accordingly the common control command can be used regardless of the country or region. That is, even when the module 3 is replaced, it is not necessary to change the software of the control unit 4.

The module 3 of the vehicular device 1 is configured to output the audio output in the common format regardless of the specifications of the tuner 17. That is, the audio signal obtained from the tuner 17 can be obtained through the common interface in addition to the control command. This makes it possible to standardize the wiring pattern and the interface.

The module 3 of the vehicular device 1 has multiple tuners 17 each of which has a different reception type. This makes it easier to deal with the differences between countries or regions. For example, the vehicular device 1 can receive digital radio programs and analog radio programs such as FM radio programs and AM radio programs.

The vehicular device 1 includes the first power supply circuit 7A for the low voltage configured to supply power even when the voltage of the battery 10 mounted in the vehicle drops, and the second power supply circuit 7B whose minimum operating voltage is higher than the minimum operating voltage of the first power supply circuit 7A. The control unit 4 is supplied with power from the first power supply circuit 7A, and the module 3 is supplied with power from the second power supply circuit 7B.

According to this, the control unit 4 configured to control the functional units of the control system can operate even when the voltage drops. In contrast, the module 3 can be stopped such that the power is not insufficient when the voltage drops. Accordingly, even when the voltage drops, the display of the control system such as the warning lights and the like which relates to the vehicle traveling and safety can be continued.

In the present embodiment, the module 3 includes the tuners 17A, 17B configured to receive the analog radio programs and the tuner 17C configured to receive the digital radio programs. However, the analog tuners and the digital tuner can be modularized independently. As a result, the influence of mutual noise can be suppressed. The module 3 that has the functional units for receiving the radio programs and a USB communication module 37 that has the functional units for performing digital communication may be modularized respectively.

Second Embodiment

Figure 8:
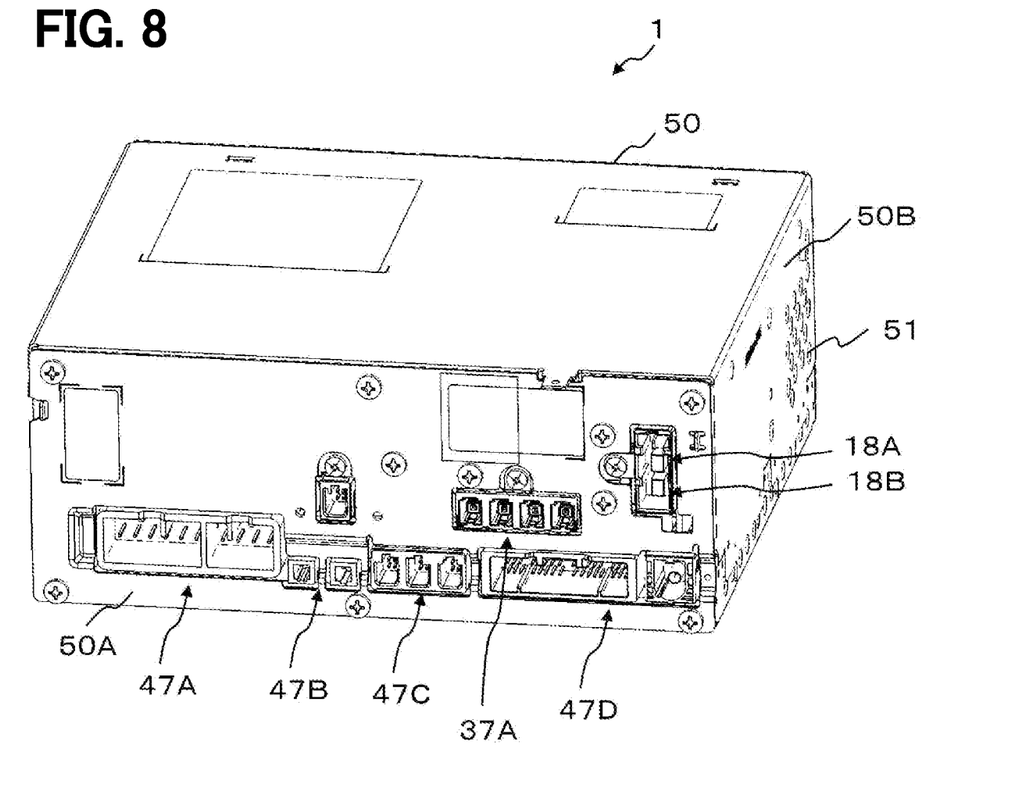
FIG. 8 is a diagram schematically showing an appearance of a vehicular device according to a second embodiment.

Next, a second embodiment will be described. In the second embodiment, the connection between the main board 2 and the module 3 of the vehicular device 1 will be described. The configuration of the vehicular device 1 is the same as the first embodiment. As shown in FIG. 8, the main board 2, the module 3, and the communication module 37 are housed in a casing 50 of the vehicular device 1 having a substantially cuboid shape.

Multiple external connectors 47A-47D constituting the external connector 47 of the main board 2, antenna connectors 18A-18B of the module 3, and a communication connector 37A of the communication module 37 are exposed from an back panel 50A of the casing 50. A left side panel 50B, which is the left side of the casing 50 when the casing 50 is viewed from the front side, has multiple air-discharging ports 51. The air-discharging ports 51 are openings for discharging the air inside the casing.

Figure 9:
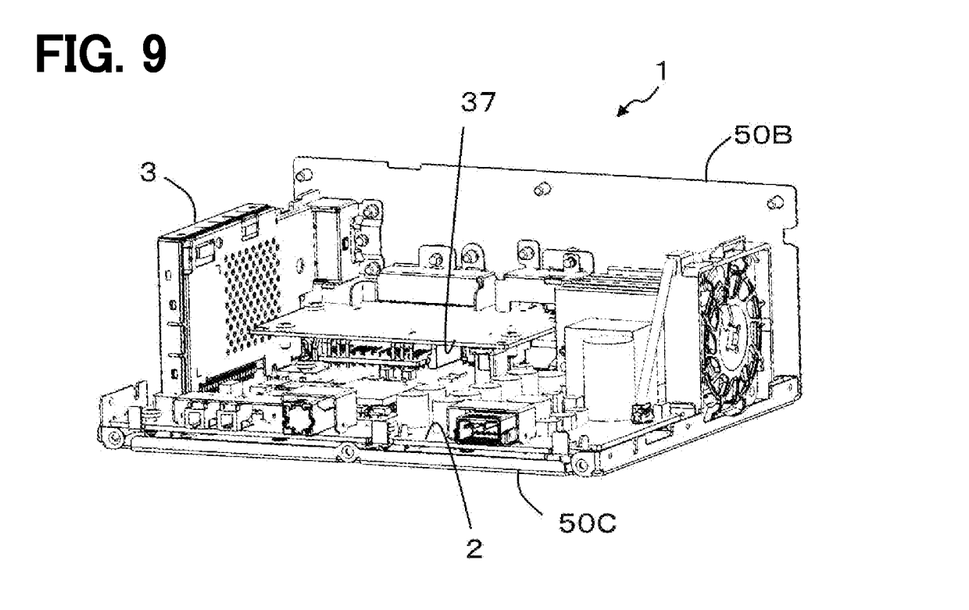
FIG. 9 is a diagram schematically illustrating an inside of the vehicular device.

The casing 50 is designed based on the so-called DIN standard and has some limitations on its width. Accordingly, as shown in FIG. 9, the main board 2, the module 3, and the communication module 37 are three-dimensionally arranged in the casing 50. Specifically, the main board 2 is attached to a bottom panel 50C of the casing 50 to be in parallel to the bottom panel 50C. That is, the main board 2 is fixed to the bottom panel 50C.

The module 3 is arranged at the left side end of the main board 2 in FIG. 9 to extend upward from the main board 2. The module 3 is connected to the main board 2 and is substantially perpendicular to the main board 2. Further, the module 3 is fixed to the casing 50 as described later. The communication module 37 is located above the main board 2 to be in parallel to the main board 2. The communication module 37 is connected to the main board 2 and is substantially in parallel to the main board 2. Further, the communication module 37 is fixed to the casing 50.

In the casing 50, a fan 52 is disposed on the right side of the main board 2 in FIG. 9. The fan 52 is arranged so as to be perpendicular to the bottom panel 50C. The right side panel of the casing 50 (not shown) has openings and holes at a portion substantially corresponding to the diameter of the fan 52. Accordingly, when the fan 52 is driven, the air is drawn from the outside to the inside of the casing 50. The air drawn into the casing 50 is discharged from the air-discharging port 51. Accordingly, the module 3 has the length in a front-rear direction of the casing 50 so as not to completely cover the air-discharging port 51.

Here, a consideration for providing the module 3 as a member separated from the main board 2 of the vehicular device 1 will be described. The vehicular device 1 is mounted in the vehicle, and the size of the vehicular device 1 is generally designed based on the so-called DIN standard. In this case, the vehicular device 1 has limitations in size, e.g., horizontal width or vertical width.

When multiple functional units are integrated with each other as in the vehicular device 1, the number of the devices used by the functional units increases. Accordingly, it is necessary to effectively use the room in the casing 50. Further, since an increase of the functional units leads to an increase of connectors for connecting with external devices, it is also necessary to consider the arrangement of the connectors. Accordingly, in the vehicular device 1, the room in the casing 50 is effectively used by arranging the module 3 three-dimensionally with respect to the main board 2.

However, when the module 3 and the communication module 37 are arranged three-dimensionally with respect to the main board 2, there may be the following concerns. That is, since the vehicular device 1 is mounted in the vehicle, the vehicular device 1 is constantly subjected to vibration. Accordingly, when the module 3 is three-dimensionally arranged with respect to the main board 2, stress may concentrate at the connection portion, which may cause damage. Further, since the multiple tuners 17 are mounted on the module 3, the weight of the module 3 increases, and accordingly the stress may increase.

In this case, it may be assumed that the damage due to the concentration of the stress can be suppressed by connecting the module 3 with the main board 2 using a movable connector such that they can relatively move. However, the movable connector is configured to be movable by contacting with an elastic contact. Therefore, when it is assumed that vibration is constantly applied as in the vehicular device 1, there is a possibility that the contact portion may be displaced to generate electrical noise, or the contact itself may be worn out.

Figure 10:
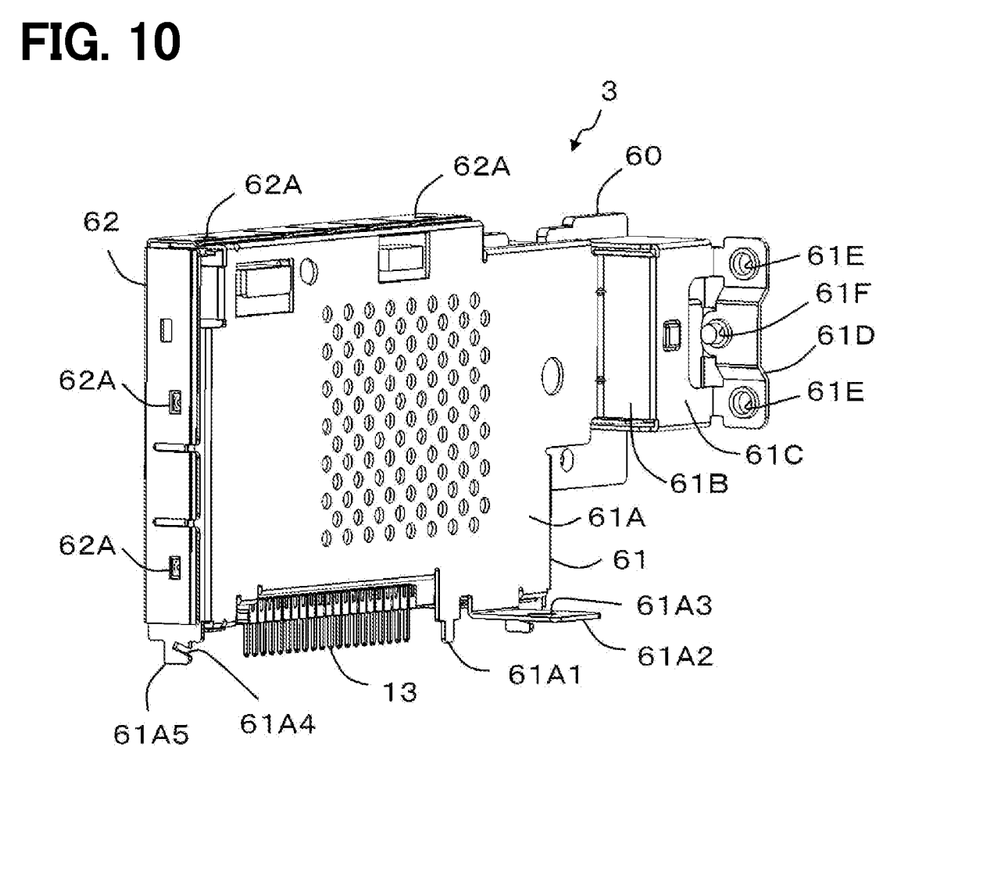
FIG. 10 is a diagram schematically illustrating an appearance of a module.

Accordingly, the vehicular device 1 is configured as follows to resolve the concerns. As shown in FIG. 10, the module 3 includes the module side board 60 on which the module side control unit 14 and the tuners 17 are mounted, a fixation portion 61 to which the module side board 60 is attached, and a cover member 62 that covers the opposite side of the module side board 60 opposite from the fixation portion 61. The module 3 has a flat cuboid shape as a whole.

Figure 11:
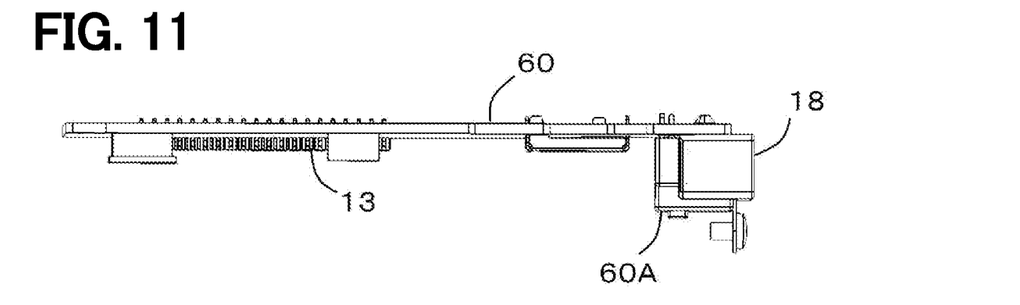
FIG. 11 is a diagram schematically illustrating a module side board.

Although the module side board 60 has mainly a flat plate shape as shown in FIG. 11, the main board 2 is notched at the right side part in FIG. 11 of the module side board 60 that faces the back panel 50A. The antenna connector 18 is mounted on an end portion facing the back panel 50A and located above the notched part. The antenna connector 18 protrudes from the surface of the module side board 60 downward in FIG. 11, and is covered with a metal shield cover 60A. The shield cover 60A is fixed with a screw 60C to the fixation portion 61.

The antenna connector 18 is located on the opposite side from the side to which the main board 2 is connected. Accordingly, when the module 3 is connected to the main board 2, the antenna connector 18 extends away from the main board 2, and accordingly a room is formed on the lower side of the antenna connector 18.

The fixation portion 61 is formed of the metal material. The fixation portion 61 can support the module side board 60 and the cover member 62, and has rigidity capable of withstanding vibration applied to the vehicular device 1. As shown in FIG. 10, the fixation portion has the main part 61A arranged to be in parallel to the module side board 60.

The main part 61A has a size that covers the module side board 60, and functions as a shield member configured to suppress the influence of the noise from the main board 2 to the module side board 60 and the influence of the noise from the module side board 60 to the main board 2. Further, the main part 61A has multiple holes to improve the cooling efficiency of the module side board 60 and reduce the weight of the module 3.

Although not shown, the main part 61A is provided with a fixing structure for fixing the module side board 60. The main part 61A has a claw portion formed by bending the left side edge, the upper side edge, and a part of the lower side edge toward the cover member 62. The cover member 62 is fixed to the main part 61A by engaging the claw portion with the openings 62A of the cover member 62. The openings 62A are provided on the side of the module side board 60.

The pin header 13 protrudes downward from the main part 61A toward the main board 2. The main part 61A has a protrusion portion 61A1. The protrusion portion 61A1 located between the pin header 13 and the back panel 50A. The protrusion portion 61A1 is soldered to the main board 2. That is, the protrusion portion 61A1 is located to overlap the thickness of the module 3 that has the thin cuboid shape as a whole. The protrusion portion 61A1 corresponds to an auxiliary fixation portion.

An end portion of the main part 61A facing the main board 2 is bent to contact the surface of the main board 2. The bent end portion is a flange 61A2 to be fixed to the bottom panel 50C of the casing 50 together with the main board 2. The flange 61A2 has insertion hole 61A3 into which the screw is inserted. The flange 61A2 corresponds to a second fixation portion.

The main part 61A has a holding portion 61A5 that is an end portion of the main part 61A facing the main board 2 and located on the opposite side from the protrusion portion 61A1 with reference to the pin header 13. The holding portion 61A5 extends below the main board 2 and has a notch 61A4 into which the main board 2 is inserted. The holding portion 61A5 is formed by bending the end portion of the main part 61A.

The main part 61A has a wall portion 61B that is an end portion facing the back panel 50A and extends from the main part 61A so as not to interfere with the antenna connector 18A. The tip end of the wall portion 61B is bent so as not to contact the antenna connector 18, and the bent tip end is the extending portion 61C extending in parallel to the main part 61A. The extending portion 61C is bent toward the module side board 60 to have the above-described claw portion.

The tip end of the extending portion 61C is bent to contact the back panel 50A. The bent tip end is a contact portion 61D. The screw holes 61E are formed on both ends of the contact portion 61D. The screw holes 61E are used for fixing the fixation portion 61 to the back panel 50A. The contact portion 61D corresponds to a first fixation portion. The center portion of the contact portion 61D is convex away from the back panel 50A, and a screw hole 61F for screwing the shield cover 60A is formed at the center of the center portion. The center portion of the contact portion 61D is formed such that the screw does not contact the contact portion of the shield cover 60A and the back panel 50A even when the shield cover 60A is screwed.

As described above, in the fixation portion 61, the main part 61A, the contact portion 61D, the protrusion portion 61A1, the flange 61A2, and the holding portion 61A5 are integrated with each other. As a reference example, a structure in which the module 3 is simply connected to the main board is shown in FIG. 12.

Figure 12:
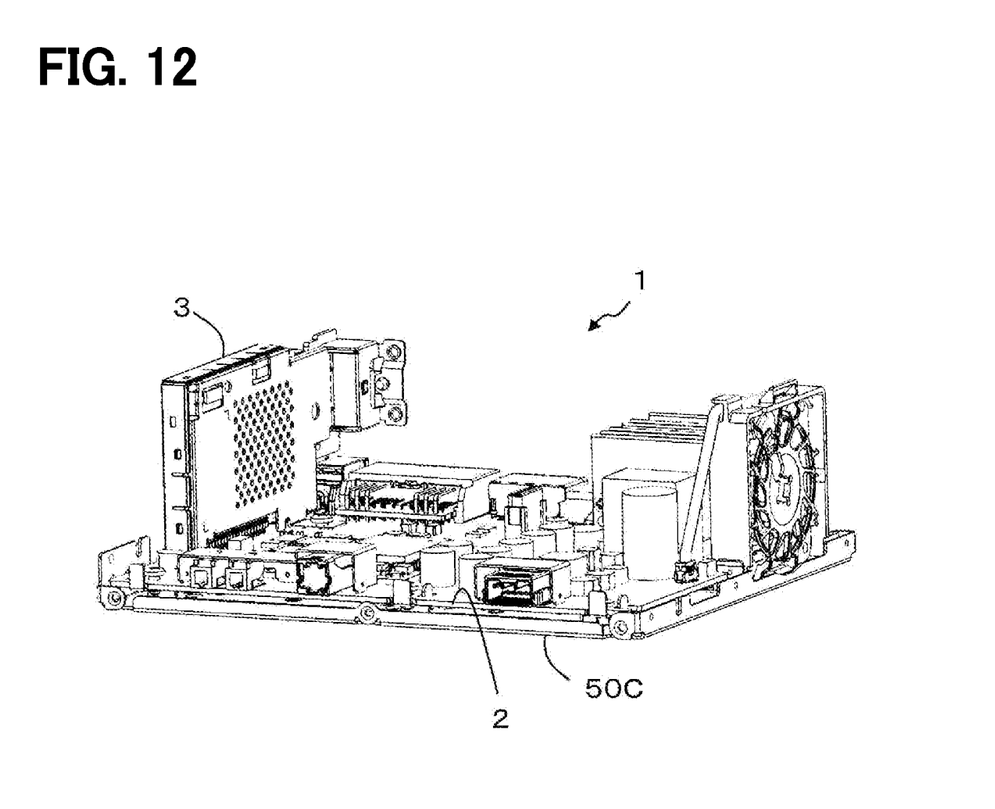
FIG. 12 is a diagram schematically illustrating a mounting mode of the module.

As shown in FIG. 12, the module 3 extends from the main board 2 to be perpendicular to the main board 2. Since the module 3 has the tuners 17 and the fixation portion 61 is formed of the metal material having high rigidity, the module 3 is vulnerable to vibration.

Therefore, in order to improve the vibration resistance, it is considered necessary to fix the module 3 to the casing 50. In a product such as the vehicular device 1, productivity for easy assembly may be also important.

Therefore, as shown in FIG. 9, the module 3 is electrically connected to the main board 2 and extends from the main board 2, and is fixed to two different surfaces of the box-shaped casing 50. In the present embodiment, the module 3 is fixed to the back panel 50A of the casing 50 and the bottom panel 50C to which the main board 2 is also fixed. Further, the module 3 is arranged closer to the end of the casing 50.

In order to suppress the vibration of the module 3, it is considered desirable to fix the module 3 at a position as far as possible from the position where the module 3 is fixed together with the main board 2. Therefore, the upper end of the module 3 is fixed to the back panel 50A. More specifically, the module 3 is fixed to the back panel 50A at the position of the antenna connector 18 provided apart from the main board 2.

Further, the module 3 is fixed to the main board 2 by soldering the protrusion portion 61A1 to the main board 2 in the vicinity of the pin header 13 soldered to the main board 2. Further, the module 3 is fixed to the main board 2 by the flange 61A2 in the vicinity of the pin header 13. By fixing in the vicinity of the pin header 13 in this way, it is possible to prevent stress from concentrating on the soldered portion of the pin header 13 when the module 3 vibrates.

Further, since an empty room is formed between the antenna connector 18 and the main board 2, the external connector 47 of the main board 2 can be arranged in the empty room. As a result, in the vehicular device 1 in which the number of external connectors 47 tends to increase due to the integration of the functional units, each connector can be offset in the vertical direction and arranged three-dimensionally, and accordingly the room in the casing 50 whose size is fixed can be effectively used.

Further, since the back panel 50A of the casing 50 is a portion originally used for arranging the external connector 47 of the main board 2, if the antenna connector 18 is arranged on the back panel 50A, the structure is not complicated. That is, since the antenna connector 18 is arranged on the same side of the external connector 47 of the main board 2, it is possible to prevent the assembly from becoming difficult. According to the embodiment described above, following advantages can be attained.

The vehicular device 1 includes the main board 2 on which the control unit 4 is mounted, the module 3 connected to the main board 2 and has different functional unit according to the product model of the vehicular device 1. The module 3 is electrically connected to the main board 2 and extends from the main board 2, and is fixed to two different surfaces of the box-shaped casing 50.

This makes it possible to arrange the modules 3 in three dimensions in the vehicular device 1 whose size may be limited. Further, by fixing the module 3 to the two surfaces, it is possible to suppress the concentration of stress at the connection point between the module 3 and the main board 2. Therefore, the room in the casing 50 can be effectively utilized, and the vibration expected in the vehicular device 1 can be dealt with.

The module 3 has a module side board 60 and a fixation portion 61 for fixing the module side board 60, and the fixation portion 61 includes the contact portion 61D as the first fixation portion fixed to the casing 50 and the flange 61A2 as the second fixation portion. The contact portion 61D and the flange 61A2 are integrated with the fixation portion 61. As a result, the module 3 can be firmly fixed to the casing 50 by utilizing the rigidity of the fixation portion 61.

The fixing member 61 is made of a metal material and functions as a shield member that covers one surface of the module side board 60. As a result, the influence of noise from the main board 2 to the module side board 60 and the influence of noise from the module side board 60 to the main board 2 can be suppressed.

The fixation portion 61 is provided with the protrusion portion 61A1 as an auxiliary fixation portion that assists in fixing the module side board 60 to the main board 2. As a result, the connection portion between the module side board 60 and the main board 2 can be reinforced, and the risk of damage due to stress can be reduced.

The protrusion portion 61A1 is located outside the pin header 13 in the longitudinal direction of the pin header 13. The pin header 13 connects the module side board 60 with the main board 2. As a result, auxiliary fixing can be performed within the thickness range of the module 3, which has a thin cuboid shape as a whole, and it is possible to prevent the space of the main board 2 from being unnecessarily occupied.

The module 3 has at least one or more of the tuner 17 as the functional unit configured to receive the radio programs. The tuner 17 having the metal shield structure has a certain weight. Therefore, when multiple tuners 17 are mounted, the weight of the module 3 increases, and the module 3 is easily affected by vibration. Even in such a case, by fixing the module 3 to two surfaces of the casing 50 as described above, the influence of vibration such as stress concentration can be suppressed.

The main board 2 is provided with the external connector 47 for external connection, and a part of the module 3 facing the back panel 50A where the external connector 47 is arranged is fixed to the casing 50 and is located above the external connector 47, for example. As a result, the internal space and the surface space of the vehicular device 1 having a limited size can be effectively used.

Further, the module 3 is arranged closer to the end of the casing 50. Since the edges of the casing 50 are close to the corner of the two surfaces, it is considered that the rigidity is relatively high as compared with the vicinity of the center of the back panel 50A, for example. Therefore, by arranging the module 3 closer to the end of the casing 50, the fixing position to the back panel 50A becomes closer to the corner, and as a result, the module 3 can be fixed more firmly.

In the embodiment, the module 3 has been mainly described, but even for a module such as the communication module 37 which is arranged parallel to the main board 2, stress concentration due to vibration can be suppressed by fixing it to the two surfaces of the casing 50.

In the embodiment, an example in which the module 3 and the main board 2 are connected by the pin header 13 is described, but the module 3 and the main board 2 may be connected by a card edge connector. Further, instead of soldering the pin header 13 directly to the main board 2, a socket may be provided on the main board 2 and the pin header 13 may be inserted into the socket. Even with such a configuration, the influence of vibration on the module 3 can be suppressed as described above.

Although the present disclosure has been described in accordance with the embodiment, it is understood that the present disclosure is not limited to the embodiment and the structure. The present disclosure includes various modifications and deformations within an equivalent range. In addition, various combinations and forms, and further, other combinations and forms including only one element, or more or less than these elements are also within the spirit and the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. Further, the computer program may store a computer-readable non-transitional tangible recording medium as an instruction to be performed by the computer.

What is claimed is:

1. A vehicular device comprising:
   a control unit;
   a main board on which the control unit is mounted; and
   a module that has a functional unit having different specifications depending on a product model of the vehicular device, wherein
   the module has a module side control unit configured to control the functional unit of the module,
   the main board and the module are housed in a casing and connected with each other through a common interface regardless of the specifications of the functional unit, and
   the module side control unit is configured to control the functional unit based on a control command received from the control unit, the control command being common regardless of the specifications of the functional unit.

2. The vehicular device according to claim 1, wherein the module has one or more of the functional units.

3. The vehicular device according to claim 1, wherein the module has a non-volatile module side storage unit configured to store settings of the functional unit.

4. The vehicular device according to claim 1, further comprising:
   a plurality of the modules connected with the main board.

5. The vehicular device according to claim 1, wherein
   the module has at least one tuner, as the functional unit, configured to receive a radio program,
   the tuner has different specifications depending on the product model of the vehicular device,
   the module has a module side connection portion configured to electrically and physically connect the module with the main board using the common interface regardless of the specifications of the tuner, and
   the module side control unit is configured to control the tuner based on the control command received from the control unit, the control command being common regardless of the specifications of the tuner.

6. The vehicular device according to claim 5, wherein
   the module is configured to output an audio output in a common format regardless of the specifications of the tuner.

7. The vehicular device according to claim 5, further comprising:
   a plurality of the tuners each of which has a different reception type.

8. The vehicular device according to claim 5, further comprising:
   a plurality of the modules, wherein
   a first module of the plurality of the module has the tuner of an analog reception type, and
   a second module of the plurality of the module has the tuner of a digital reception type.

9. The vehicular device according to claim 1, further comprising:
   a first power supply circuit configured to supply power even when a voltage of a battery mounted in a vehicle drops;
   a second power supply circuit whose minimum operating voltage is higher than a minimum operating voltage of the first power supply circuit, wherein
   the control unit is supplied with power from the first power supply circuit, and
   the module is supplied with the power from the second power supply circuit.

* * * * *